United States Patent
Hara et al.

(10) Patent No.: US 9,062,980 B2
(45) Date of Patent: Jun. 23, 2015

(54) AUTONOMOUS MOBILE SYSTEM

(75) Inventors: Yoshitaka Hara, Tokyo (JP); Akira Oshima, Tokyo (JP); Ryoko Ichinose, Tokyo (JP); Kenjiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/359,335

(22) PCT Filed: Nov. 22, 2011

(86) PCT No.: PCT/JP2011/076961
§ 371 (c)(1),
(2), (4) Date: May 20, 2014

(87) PCT Pub. No.: WO2013/076829
PCT Pub. Date: May 30, 2013

(65) Prior Publication Data
US 2014/0309841 A1    Oct. 16, 2014

(51) Int. Cl.
*G01C 21/28* (2006.01)
*G05D 1/02* (2006.01)
*G01S 17/89* (2006.01)
*G01C 21/30* (2006.01)
*G01C 21/32* (2006.01)

(52) U.S. Cl.
CPC ............... *G01C 21/28* (2013.01); *G05D 1/024* (2013.01); *G05D 1/0248* (2013.01); *G05D 1/0251* (2013.01); *G05D 1/0274* (2013.01);
(Continued)

(58) Field of Classification Search
CPC ... G05D 1/024; G05D 1/0274; G05D 1/0248; G05D 1/0251; G05D 2201/0213; G01C 21/32; G01C 21/28; G01C 21/30; G01S 17/89

USPC ........ 701/26, 23; 348/116, 135, 46, E13.004; 909/1, 46
See application file for complete search history.

(56) References Cited

U.S. PATENT DOCUMENTS 6,477,260 B1 * 11/2002 Shimomura ................... 382/106
8,249,084 B2 * 8/2012 Jiang et al. .................... 370/400
(Continued)

FOREIGN PATENT DOCUMENTS

JP    2004-110802 A    4/2004
JP    2005-88175 A     4/2005
(Continued)

OTHER PUBLICATIONS

International Search Report dated Feb. 14, 2012 with English translation (Four (4) pages).

*Primary Examiner* — Marthe Marc-Coleman
(74) *Attorney, Agent, or Firm* — Crowell & Moring LLP

(57) ABSTRACT

An autonomous mobile system for a mobile body which moves while localizing itself in a space includes a shape detector and travel distance detector for measuring whether objects are present in set regions determined by dividing a three-dimensional space into a plurality of segments, a storage device into which map data is stored that indicates a region of the set regions that has been set as having a stationary object in the region, a determining section that determines, from frequency of the object detection by the shape detector during a predetermined time for each of the set regions, whether the object that has been detected in each set region is a stationary object or a moving object, and a localizer that localizes a vehicle by matching the region that the determining section has determined to have a stationary object in the region, and the map data.

10 Claims, 8 Drawing Sheets

(52) U.S. Cl.
CPC ........ *G05D2201/0213* (2013.01); *G01S 17/89* (2013.01); *G01C 21/30* (2013.01); *G01C 21/32* (2013.01)

(56) References Cited

U.S. PATENT DOCUMENTS

2001/0055063 A1 12/2001 Nagai et al.
2012/0182392 A1* 7/2012 Kearns et al. .................. 348/46

FOREIGN PATENT DOCUMENTS

| | | | |
|---|---|---|---|
| JP | 2008-276348 | A | 11/2008 |
| JP | 2010-86418 | A | 4/2010 |
| JP | 2011-22157 | A | 2/2011 |
| JP | 2011-209845 | A | 10/2011 |
| JP | 2011-210121 | A | 10/2011 |

* cited by examiner

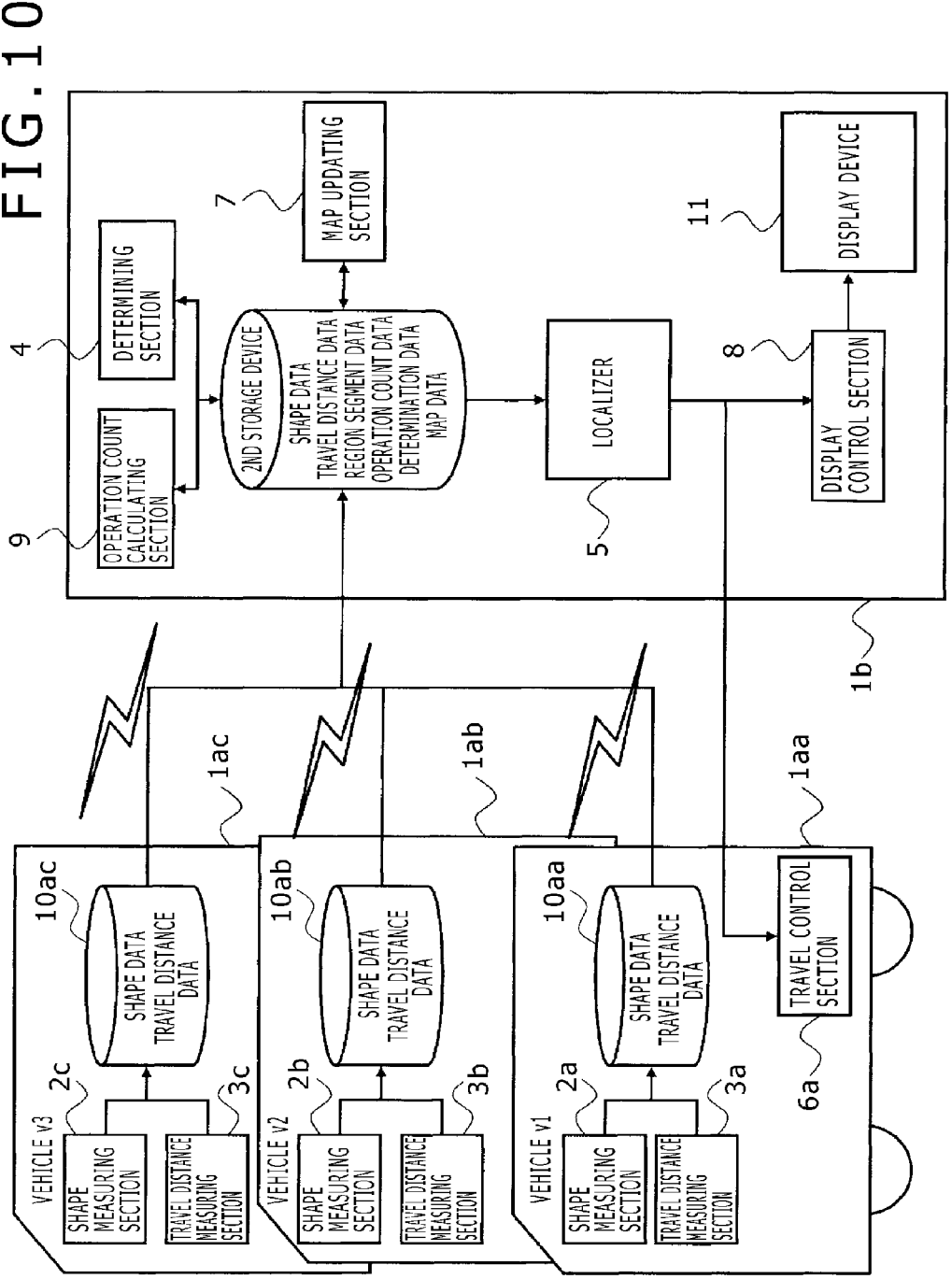

AUTONOMOUS MOBILE SYSTEM

TECHNICAL FIELD

The present invention relates to an autonomous mobile system for a mobile body which moves while localizing itself in a space.

BACKGROUND ART

There is an autonomous mobile system designed for a mobile body (such as vehicle) that moves while localizing itself in a space. Such an autonomous mobile system causes the mobile body to move to a destination while referring to a map generated from the data that has been measured by a measuring device(s) such as an internal sensor (a sensor for measuring a state of the mobile body itself) and/or external sensor (a sensor needed for the mobile body to measure a state of surroundings while moving).

This kind of autonomous mobile systems fall into two major types. One type, disclosed in JP-2004-110802-A), causes the mobile body to move autonomously by recognizing landmarks and/or other specific shapes by use of a camera as an external sensor, and generating a map. The other type, disclosed in JP-2008-276348-A, causes the mobile body to move autonomously as follows: using a laser range scanner as an external sensor, the mobile body first matches (superposes) sequentially the shape data of a peripheral object that has been acquired at the current time of day, to (upon) the shape data of the peripheral object that was acquired at an immediately previous point in time at a position different from a current position of the mobile body, then extends the region where the shape data of the peripheral object has been measured, and thus generates a map.

PRIOR ART LITERATURE

Patent Documents

Patent Document 1: JP-2004-110802-A
Patent Document 2: JP-2008-276348-A

SUMMARY OF THE INVENTION

Problem to be Solved by the Invention

As described above, conventional autonomous mobile systems have realized the localization of the respective vehicles by matching (superposing) the shape data of a peripheral object, measured using a measuring device such as a laser range scanner or stereo camera, to (upon) a map within which the shape of the peripheral object is stored beforehand.

In a traveling environment of the mobile body, however, there exist other mobile bodies, including peripheral vehicles, pedestrians, bicycles, grit and dust, fallen leaves, animals, and other movable objects (e.g., tables, chairs, and planters). If the shape data obtained by measuring the shapes of these peripheral mobile bodies is matched to the map, the peripheral mobile bodies may not be properly superposed upon a shape of the map since the peripheral mobile bodies are originally not included in the map. Such mismatching is likely to increase a localizing error, thus cause the mobile body with the autonomous mobile system to lose sight of a target path as well as control of localization, and thus render the mobile body difficult to continue the movement.

An object of the present invention is to provide an autonomous mobile system that enables highly accurate detection of positions, even in an environment with mobile objects therein.

Means for Solving the Problem

In order to achieve the above object, an aspect of the present invention is an autonomous mobile system for a mobile body which moves while localizing itself in a space, the system including: measuring means for measuring whether objects are present in each of regions determined by dividing the space into a plurality of segments according to a predetermined rule; storage means into which map data is stored that indicates a region of the determined regions that has been set as having a stationary object in the region; means for determining, from frequency of the object detection by the measuring means during a predetermined time for each of the determined regions, whether the object that has been detected in the region is a stationary object or a moving object; and means for localizing the mobile body by matching the region having therein the stationary object which the determining means has determined to be present, and the region that was set in the map data as having a stationary object in the region.

Effects of the Invention

In the autonomous mobile system according to an aspect of the present invention, peripheral objects that have been detected are each determined to be either a stationary object or a moving object. This enables highly accurate matching, even in an environment having at least one moving object therein, and hence enables the mobile body to reach a destination without losing sight of a target path as well as control of localization.

BRIEF DESCRIPTION OF THE DRAWINGS

FIG. 10 is a schematic block diagram of an autonomous mobile system according to a second embodiment of the present invention.

MODE FOR CARRYING OUT THE INVENTION

Hereunder, embodiments of the present invention will be described with reference to the accompanying drawings. While a wheeled vehicle "v" (e.g., a motor vehicle) as a mobile body will be taken by way of example in the description of the embodiments, the invention can also be applied to, for example, mobile bodies equipped with crawlers, and robots equipped with legs, and a form or pattern in which the mobile bodies move is not limited.

Figure 1:
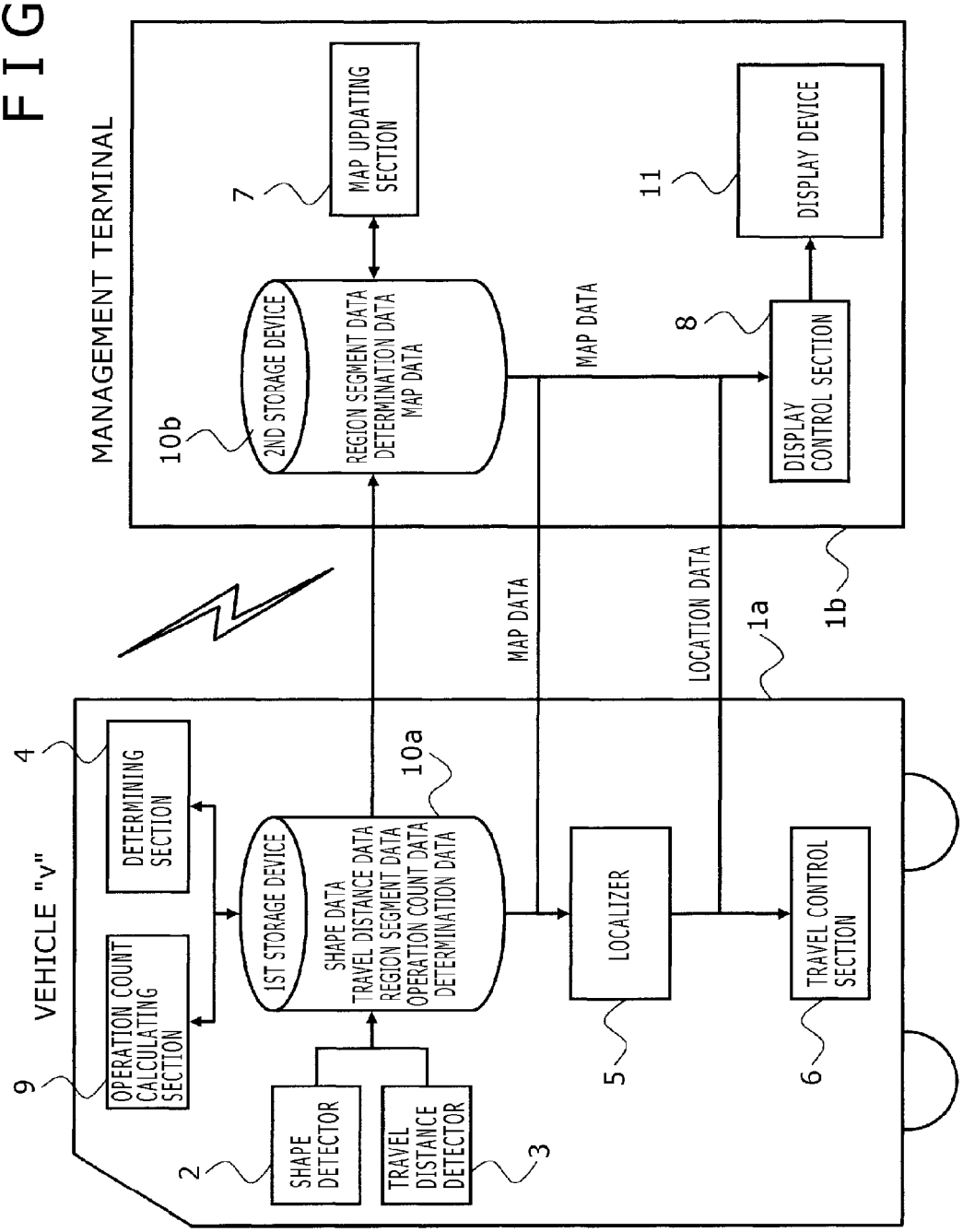
FIG. 1 is a schematic block diagram of an autonomous mobile system according to a first embodiment of the present invention.

FIG. 1 is a schematic block diagram of an autonomous mobile system according to a first embodiment of the present invention. The autonomous mobile system shown in FIG. 1 includes an onboard unit 1a, which is mounted on the vehicle "v", and a management unit 1b, which is mounted in a management terminal (e.g., a computer) present in a building or any other management facilities. The onboard unit 1a and management unit 1b shown in FIG. 1 are connected to each other via a wireless network, to conduct data communications via the network.

The onboard unit 1a includes a shape detector 2, a travel distance detector 3, an operation counting calculation section 9, a determining section 4, a localizer 5, a travel control section 6, an arithmetic processing unit, for example a CPU (not shown), intended to run various control programs, and a first storage device 10a (e.g., ROM, RAM, HDD, and/or flash memory) intended for storage of various data including the control programs.

The shape detector 2, travel distance detector 3, and operation counting calculation section 9 in the first embodiment of the present invention function as measuring means to measure the presence/absence of objects in regions determined by dividing into a plurality of segments according to a predetermined rule a three-dimensional space in which the vehicle "v" travels (hereinafter, the regions may be referred to as "set regions" or simply as "regions"). As will be detailed later herein, closed regions of a cubic form that are obtained by dividing the three-dimensional space by three-dimensional voxels of predetermined dimensions are used as the set regions in the present embodiment.

The shape detector (shape detection means) 2 is a device for detecting shapes of buildings, trees, terrains (e.g., hills and cliffs), and other stationary objects present around the vehicle "v", and shapes of other peripheral vehicles, pedestrians, bicycles, grit and dust, fallen leaves, animals, and other movable objects (e.g., tables, chairs, and planters) present around the vehicle "v". The shape detector 2 can be, for example, a laser range scanner, a stereo camera, or a time-of-flight (TOF) distance image camera. The shapes of the peripheral objects that have been measured by the shape detector 2 are input with their measuring time to the first storage device 10a and stored as shape data.

The travel distance detector (travel distance detection means) 3 is a device for detecting a distance through which the vehicle "v" has moved. In the present embodiment, the total amount of wheel rotation of the vehicle "v" is calculated to detect a cumulative travel distance through which the vehicle "v" has moved from a position at which it existed a predetermined control period ago (e.g., one period ago), to a current position of the vehicle "v". For example, a known method (reference document: J. Borenstein and L. Feng, Gyrodometry: "A New Method for Combining Data from Gyros and Odometry in Mobile Robots", Proc. of ICRA '96, 1996) is useable as this kind of detection method. The known detection method uses a combination of inertial sensors and gyrosensors, called the Inertial Measurement Unit (IMU). The travel distance that the travel distance detector 3 has detected is input to the first storage device 10a and stored as shape data.

The operation counting calculation section (operation counting calculation means) 9 executes the process of calculating, for each of the set regions which were determined by dividing beforehand the three-dimensional space in which the vehicle "v" was planned to move, the number of times the shape detector 2 has measured and detected the presence/absence of at least one object at the different time of day (i.e., the measurement count), and the number of times the shape detector 2 has actually detected at least one object in each of the set regions during the measurements (i.e., the detection count). What is to be reiterated here is that the measurement count refers to how often the shape detector 2 has conducted measurements for detecting at least one object in each of a predetermined number of set regions, and that the detection count refers to how often the shape detector 2 has actually detected at least one object in each of the predetermined number of set regions during the measurements. The measurement count increases, irrespective of detection results, and the detection count increases only when at least one object is detected.

Although details are described later herein, the operation counting calculation section 9 in the present embodiment calculates operation count data (measurement count data and detection count data) from the shape data, travel distance data, and region segment data stored within the first storage device 10a. The measurement count and detection count that have been calculated by the operation counting calculation section 9 are input to the first storage device 10a and stored as the measurement count data and the detection count data (the two sets of data may be hereinafter termed collectively as operation count data).

The determining section 4 executes the process of determining, from frequency of the object detection by the shape detector 2 during a predetermined time (a time interval from the current time of day to the immediately previous time) for each of the determined regions (i.e., for each three-dimensional voxel), whether at least one of the objects which were detected in the determined region is a stationary object or a moving object. Although details are described later herein, the determining section 4 in the present embodiment conducts the calculation of the frequency of object detection, based on the operation count data (measurement count and detection count) that the vehicle "v" obtained during the predetermined time from the measuring means (the shape detector 2, the travel distance detector 3, and the operation count calculating section 9). In addition, the determining section 4 determines, from the calculated frequency of object detection, whether at least one object in each of the set regions is a stationary object or a moving object. Determination results by the determining section 4 are input to the first storage device 10a and stored as determination data.

The shape data detected by the shape detector 2, the travel distance data detected by the travel distance detector 3, the operation count data calculated by the operation count calculating section 9, the determination data calculated by the determining section 4, and region segment data are stored in the first storage device 10a. The region segment data here, which indicates divisions of the set regions used to obtain the operation count data, is data that indicates in what form the three-dimensional space where the vehicle "v" moves is divided in the plurality of closed regions (set regions). In the present embodiment, where in the three-dimensional space the respective three-dimensional voxels are positioned is stored. In which region the objects or part thereof is positioned can be determined by associating the shape data and the region segment data with each other.

The localizer (localizing means) 5 is a section that executes the process of localizing the vehicle "v" by matching the region that the determining section 4 determined to have at least one stationary object therein (i.e., the shape of the stationary object that the vehicle "v" measured), to the region that was set in map data (described later) of a second storage device 10b as the region in which the stationary object is present. The above matching refers to superposing one of the two regions upon the other. More specifically, this matching process can be conducted using, for example, a known method (reference document: Takeshi Masuda, Ikuko Okatani (Shimizu), and Ryusuke Sagawa, "Range Data Processing—A Survey of Shape Model Generation from Multiple Range Images", Proc. of the 146th CVIM, 2004).

The travel control section 6 drives the wheels or the like of the vehicle "v" and controls autonomous travel of the vehicle. The travel control section 6 uses calculation results by the localizer 5 to control the vehicle "v" so that this vehicle travels to a destination in accordance with a predefined target path.

The management unit 1b includes a map updating section 7, a display control section 8, an arithmetic processing unit (not shown, for example a CPU) for running various control programs, the second storage device 10b (e.g., ROM, RAM, HDD, and/or flash memory) intended for storage of various data including the control programs, and a display device 11.

The kinds of data stored in the second storage device 10b include the map data denoting, of all the set regions, only the region that was set as having at least one stationary object therein, and the same region segment data, determination data, and operation count data as stored in the first storage device 10a.

The map data is the data serving as a basis for the localizer 5 to localize the vehicle "v", and based on detailed prior data measurements and the like, the map data denotes only the region of the set regions that was set as having at least one stationary object therein. The map data in the present embodiment, as with the set regions, has a data format expressed in three-dimensional voxels, and the stationary object in the three-dimensional space is defined as a set of voxels. That is to say, this data format is equivalent to a three-dimensional data format to which a bitmap format in two-dimensional images was extended. In addition, in the present embodiment, the map data is appropriately updated according to particular determination results of the determining section 4.

While, in the example of FIG. 1, region segment data, determination data, and operation count data are shown as the kinds of data stored in the first storage device 10a, other kinds of data may be stored therein. In addition, while FIG. 1 assumes that input of data from the first storage device 10a to the second storage device 10b occurs automatically at predetermined intervals of time via the wireless network, the system may be configured to move data from the first storage device 10a to the second storage device 10b periodically either by wired connection or via any other appropriate storage medium. The map updating section 7 executes the process of updating, on the basis of the determination results (determination data) by the determining section 4, the region that was set in the map data of the second storage device 10b as a region in which at least one stationary object is present. In other words, the map updating section 7 in the present embodiment executes the process of updating the map data within the second storage device 10b, pursuant to the determination data that the vehicle "v" obtained.

The display control section 8 executes the process of receiving the map data from the second storage device 10b and the position data from the localizer 5, then calculating, from the two sets of data, a display signal needed for the display device 11 to display the map data and an estimated position of the vehicle "v", and transmitting the display signal to the display device 11. The display device 11 displays peripheral map information and the position of the vehicle "v" in accordance with the display signal that is input from the display control section 8. The display device 11 may be constructed integrally with or independently of the management terminal.

Figure 2:
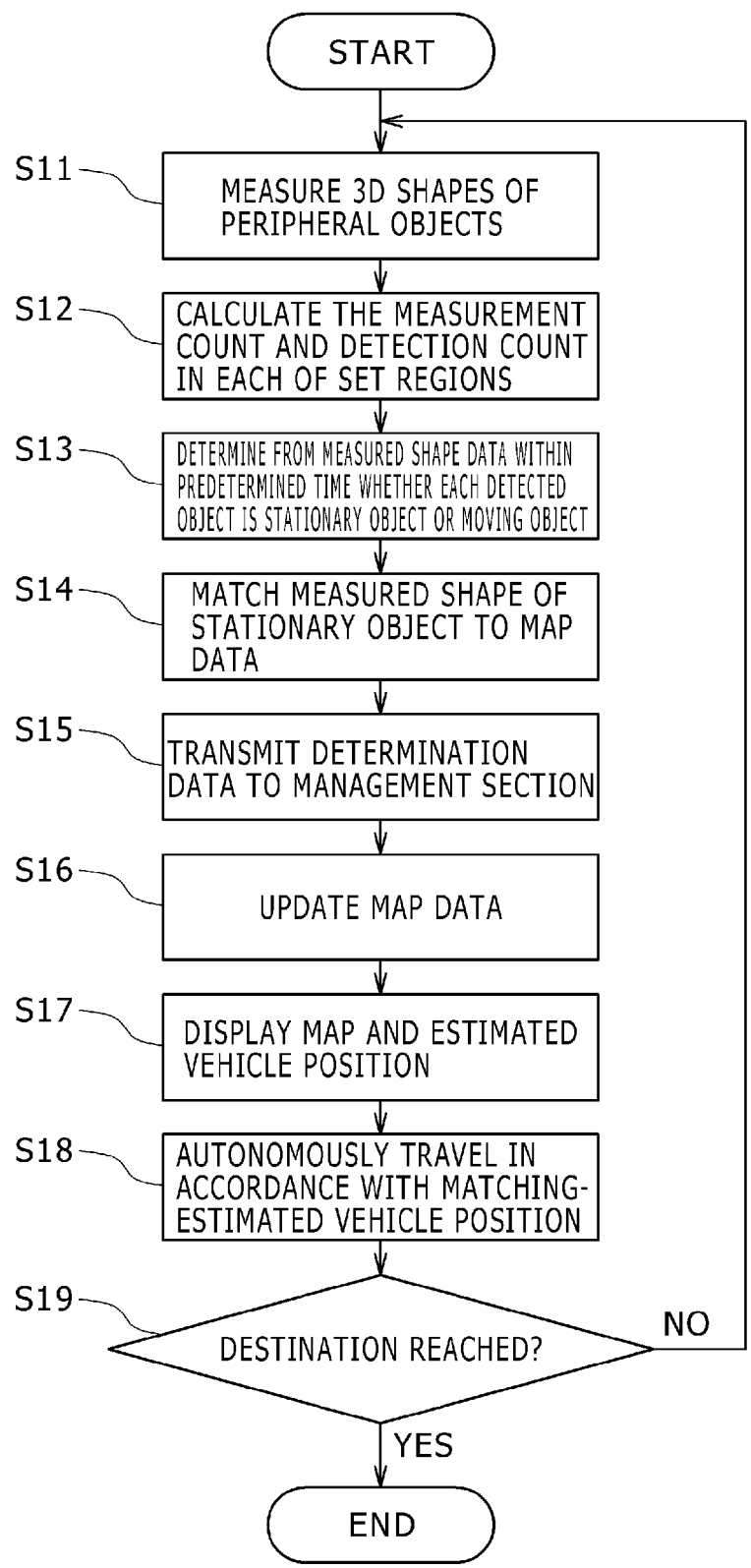
FIG. 2 is a flowchart that shows details of processing which the autonomous mobile system executes according to the first embodiment of the present invention.

Next, further details of processing by the autonomous mobile system according to the present embodiment are described below referring to the accompanying drawings. FIG. 2 is a flowchart that shows the details of processing which the autonomous mobile system executes according to the first embodiment of the present invention. The autonomous mobile system executes processing shown in the flowchart of FIG. 2, and thereby determines whether the shape data relating to measured peripheral objects denotes stationary objects or moving objects. Highly accurate localization can therefore be realized, even in a traveling environment with moving objects existing therein, such as other vehicles (vehicles other than the vehicle "v"), pedestrians, bicycles, grit and dust, fallen leaves, animals, tables, chairs, planters, and other movable objects. Processing in various steps of the flowchart shown in FIG. 2 is described in detail below.

Upon a start of processing, in step S11 the onboard unit 1a of the autonomous mobile system first uses the shape detector 2 to measure three-dimensional shapes of objects present around the vehicle "v" (these objects include both of stationary ones and moving ones), and acquire the shape data, and also uses the travel distance detector 3 to measure a travel distance of the vehicle "v" and acquire the travel distance data.

Figure 3:
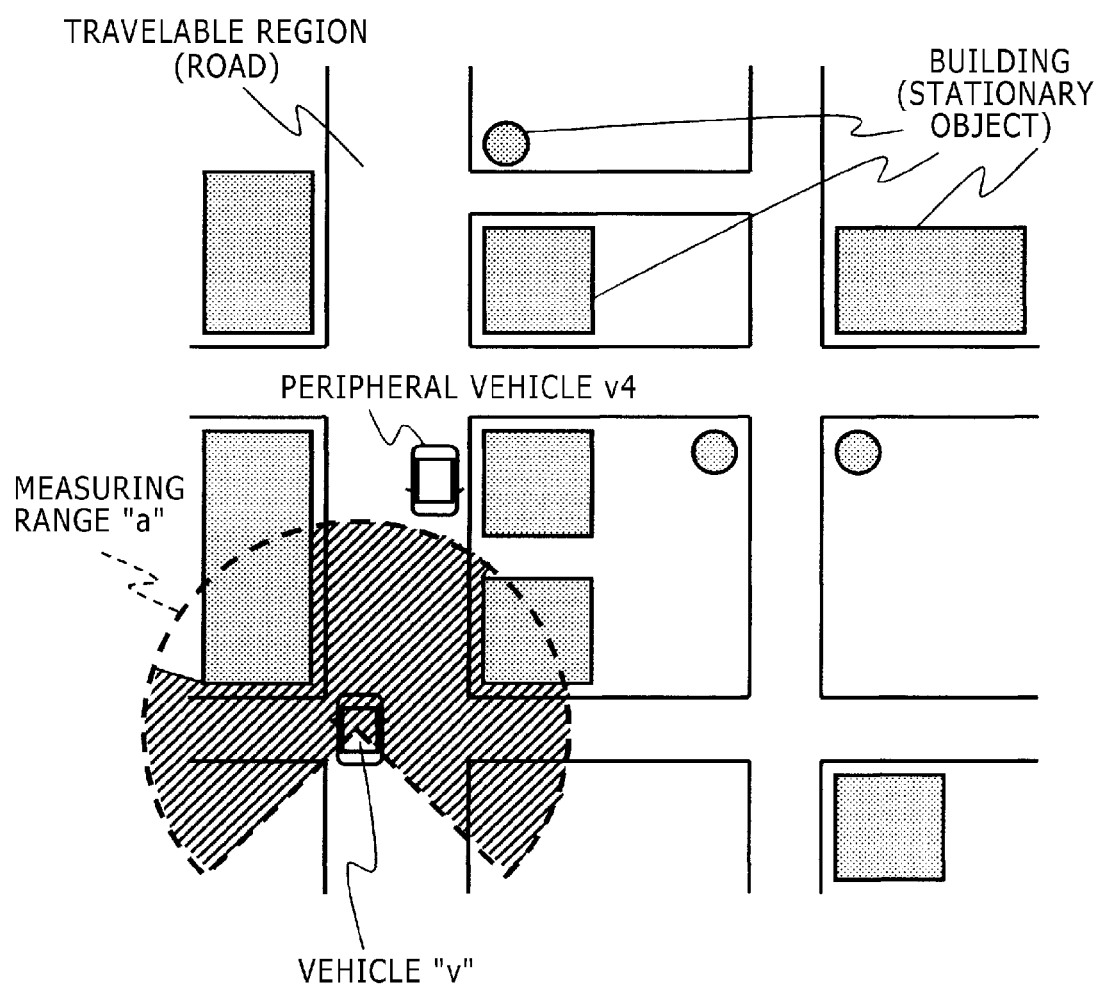
FIG. 3 is a diagram showing the way a shape detector 2 measures shapes of objects present around a vehicle "v".

FIG. 3 is a diagram showing the way the shape detector 2 measures the shapes of the objects present around the vehicle "v". The shape detector 2, mounted on the vehicle "v" running through a travelable region (e.g., a road) in the three-dimensional space, measures the shapes of objects present in a measuring range "a" of the detector. The shape data acquired here includes both of the shapes of stationary objects such as buildings, and those of moving objects such as vehicles other than the vehicle "v".

If a laser range scanner is being used as the shape detector 2, objects hidden and concealed behind a detected object are not detected, even within the measuring range "a" defined by a dashed line of a substantially concentric form from the vehicle "v". This means that an actual detection range is a region shaded in the measuring range "a" of FIG. 3, and that the measurement count and detection count for each of the set regions included in the shaded region will increase.

Figure 4:
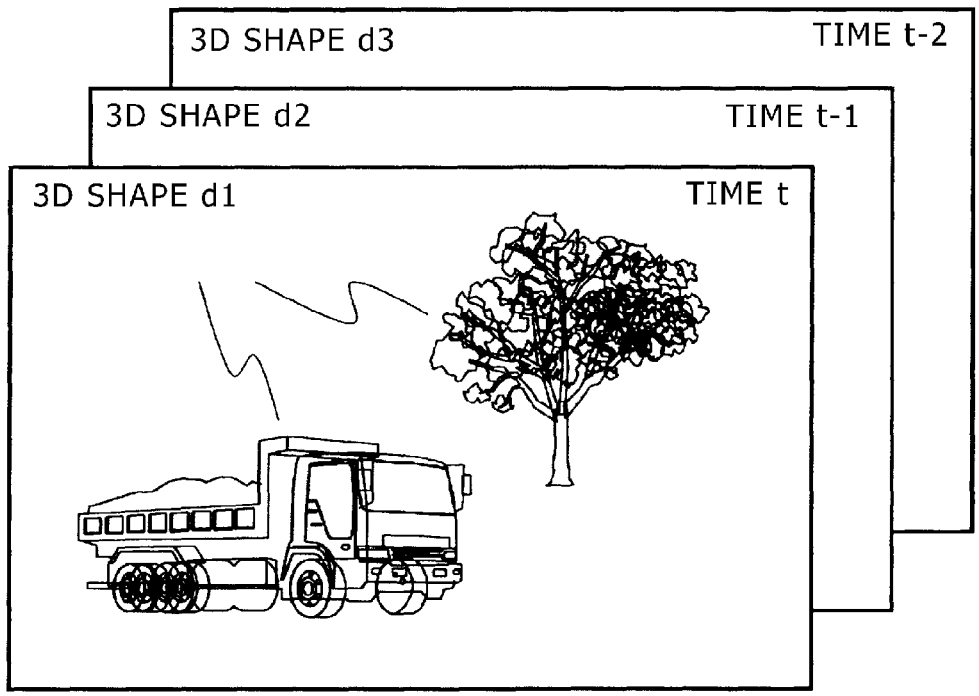
FIG. 4 is a diagram showing a plurality of sets of shape data that have each been measured at the different time of day during a predetermined length of time, a, by the shape detector 2.

FIG. 4 is a diagram showing a plurality of sets of shape data that have each been measured at the different time of day during a predetermined length of time, a, by the shape detector 2. In this figure, if the current time of day is taken as time "t", three-dimensional shapes d1 are measured at the time "t". Additionally, three-dimensional shapes d2 are measured at time "t−1", one unit time ago, and three-dimensional shapes d3 are measured at time "t−2", one more unit time ago. The one unit time here is an amount of time needed for the shape detector 2 to complete one measurement, and for example, if a laser range scanner of a one-second period is being used as the shape detector 2, the one unit time here is an interval of one second.

After step S11 has ended, the operation count calculating section 9 calculates the measurement count and the detection count, for each of the set regions.

Figure 5:
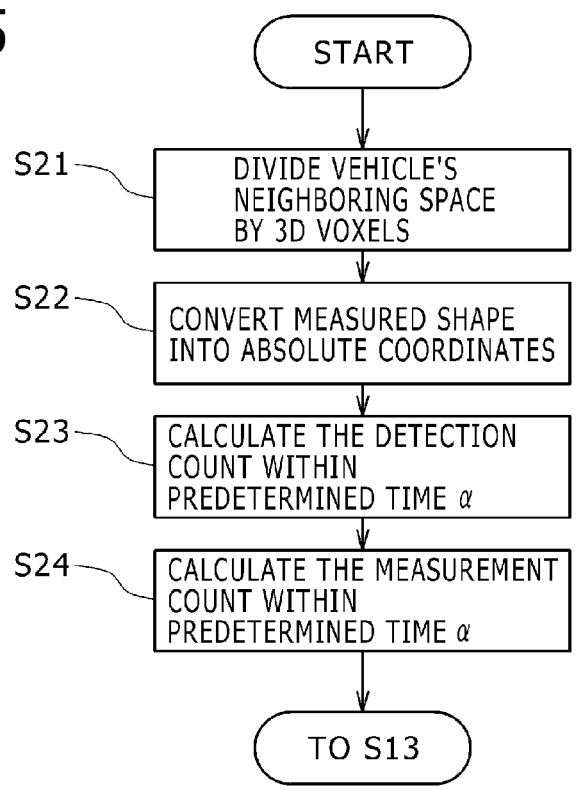
FIG. 5 is a detailed flowchart of a process which an operation counting calculation section 9 according to the first embodiment of the present invention conducts.

As shown in FIG. 5, the operation count calculating section 9 first executes pre-processing for each operation count calculation. More specifically, in step S21 the operation count calculating section 9 refers to the region segment data stored within the first storage device 10a, and divides, by the set regions (three-dimensional voxels), the space for which the presence/absence of objects that the shape detector 2 has detected around the vehicle "v" is to be identified. The space divided is equivalent to the shaded region in FIG. 3. In the present embodiment, each of the set regions is defined in terms of the three-dimensional voxels obtained by dividing the three-dimensional space into a plurality of solids. Each voxel has its dimensions dictated with dependence upon dimensions of the objects to be determined to be stationary or moving ones. For example, if the dimensions of the objects to be determined are those of a motor vehicle, a building, or the like, voxels measuring from about 0.5 to 1.0 meter square will be set. For convenience sake, while each of the set regions is defined as a solid in the present embodiment, these set regions may be defined as other solid shapes such as parallelepipeds, spheres, or triangular pyramids.

The operation count calculating section 9 next converts coordinates of the three-dimensional shapes "d" each measured at the different time of day during the predetermined time by the shape detector 2, according to the travel distance of the vehicle "v" that was measured by the travel distance detector 3. After canceling the movement of the vehicle "v" in this way, in step S22 the operation count calculating section 9 further converts the position coordinates of the three-dimensional shapes "d" from the vehicle coordinate system (the coordinate system fixed for the vehicle "v") to an absolute coordinate system.

After the conversion, in step S23 the operation count calculating section 9 calculates the detection count in accordance with which voxel (set region) on the absolute coordinate system contains each of the three-dimensional shape "d". In other words, if the three-dimensional shapes "d" measured by the shape detector 2 are present in the three-dimensional voxels neighboring the vehicle "v", the detection count is increased. This process is conducted for the three-dimensional shapes "d" measured from the current time of day, "t", to the time of day, t−α, that is the predetermined time ago (a is a set value). That is to say, this process increases the measurement count for the voxels by up to a count value obtained by dividing a by one unit time of the shape detector 2.

The operation count calculating section 9 also calculates the measurement count of the voxels, along with the above calculation of the detection count, in step S24. The calculation of the measurement count is accomplished by identifying the voxels contained in the region (shaded region in FIG. 3) that the shape detector 2 actually detected the existence of objects by measurement, and increasing the measurement count for the identified voxels by 1. The measurement count and detection count that the operation count calculating section 9 calculated in steps S23, S24 are input to the first storage device 10a and stored as operation count data.

Upon completion of step S24, processing advances to step S13 shown in FIG. 2. In step S13, the determining section 4 makes independent reference to the measurement count and detection count for each voxel which was measured during the predetermined time α, and determines whether the object detected in each voxel is a stationary one or a moving one. In this step, whether an object exists in the voxel is determined first. If an object is determined to be present, whether the object is a stationary one or a moving one is determined next. If an object is determined to be absent, the region is determined to be a free space. When the determining section 4 in the present embodiment conducts the determination in each voxel, the determining section 4 refers to the operation count data stored within the first storage device 10a and calculates, for each voxel, a rate of the detection count to the measurement count (i.e., a value of the detection count/measurement count, and this value may be hereinafter termed the "occupancy score"). If the occupancy score is equal to or greater than a predetermined threshold value β (say, 0.8), the object present in the particular voxel is determined to be a stationary object, or if the occupancy score is less than the predetermined threshold value β, the object is determined to be a moving object, or if the occupancy score is zero, the region is determined to be a free space. Determination results on each voxel are input from the determining section 4 to the first storage device 10a and stored as determination data.

The occupancy score for the voxels each containing a stationary object increases because the measurement of a three-dimensional shape "d" is continued from the past to the present. The occupancy score for the voxels each containing a moving object decreases relative to the above, because the measurement of a three-dimensional shape "d" takes place only during part of the time from the past to the present. The occupancy score for the voxels each determined to be a free space becomes zero because of a three-dimensional shape "d" not being measured.

Figure 6:
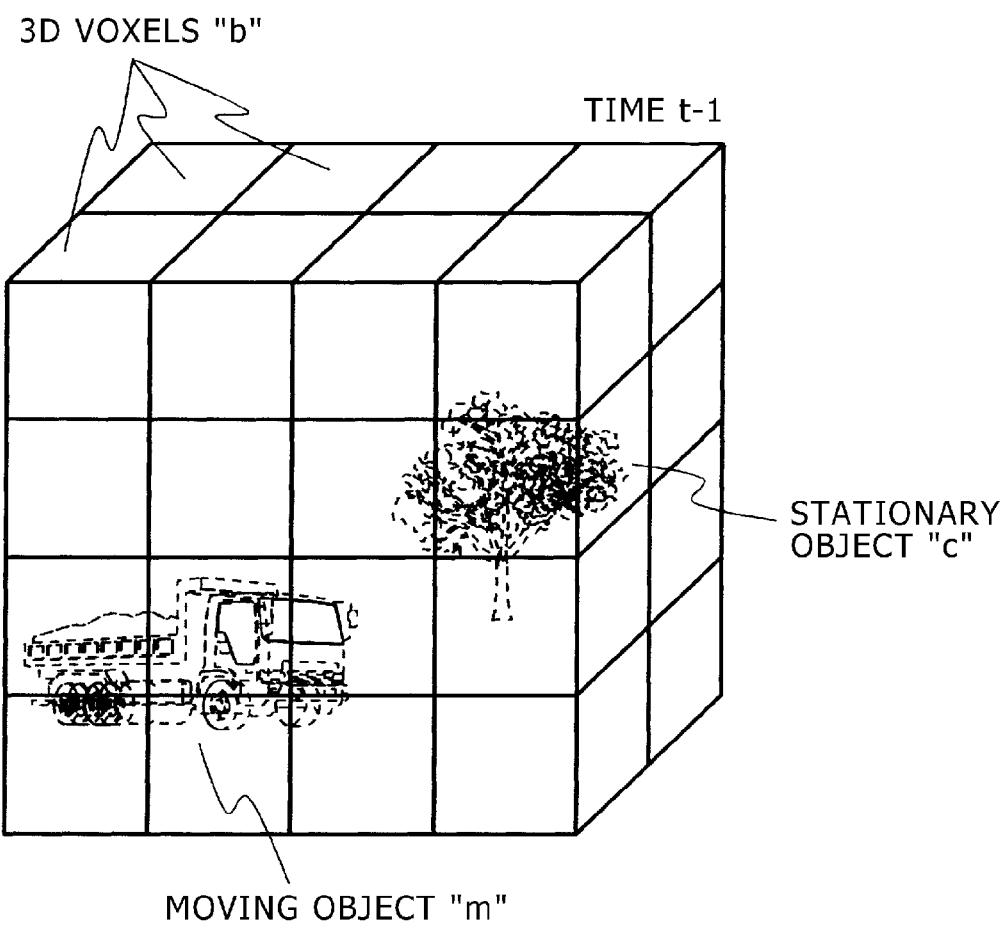
FIG. 6 is a diagram showing, in three-dimensional voxels "b", three-dimensional shapes "d" that the shape detector 2 measured at time t−1.
Figure 7:
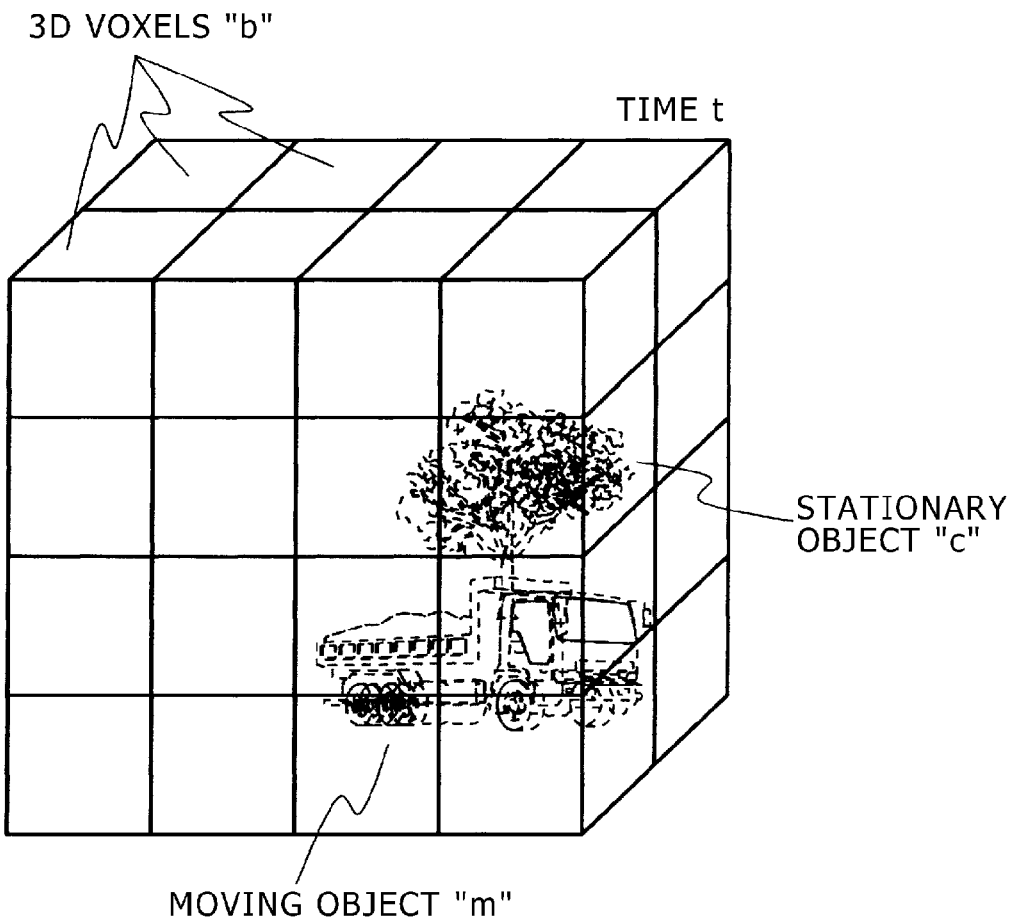
FIG. 7 is a diagram showing, in other three-dimensional voxels "b", the three-dimensional shapes "d" that the shape detector 2 measured at time t.

The three-dimensional shapes "d" that were each measured at the different time of day (i.e., time t−1 and time "t") are shown in three-dimensional voxels "b" by way of example in FIGS. 6 and 7. The shapes of a stationary object "c" and a moving object "m" are measured in both of the examples. Of all the three-dimensional voxels "b" formed by dividing a space, only those having the stationary object "c" present therein have a three-dimensional shape "d" measured at both of the time t−1 and the time "t". Because of this, the occupancy score increases and in process step S13, the object is determined to be a stationary one. For the voxel through which the moving object "m" has moved, on the other hand, because the three-dimensional shape "d" is measured only at either of the time t−1 and the time "t", the occupancy score decreases, so in process step S13, the object is determined to be a moving one. For voxels without an object, because at neither the time t−1 nor the time "t" is a three-dimensional shape "d" measured, the occupancy score becomes zero and in process step S13, those regions are each determined to be a free space.

Upon completion of step S13, in step S14 the localizer 5 localizes the vehicle "v" by matching the set region having therein the stationary object which the determining section 4 determined to be present, and at least one of the regions which were set in the map data of the second storage device 10b as the regions each having at least one stationary object therein.

In this step, in order to identify the region having therein the stationary object which the determining section 4 determined to be present, the localizer 5 first refers to the determination data within the first storage device 10a and extracts the three-dimensional shape "d" belonging to the voxel which was determined to have a stationary object therein, as the shape of the stationary object. Next, the localizer 5 refers to the map data within the second storage device 10b and extracts the three-dimensional shape belonging to the voxel which was determined to have a stationary object therein, as the shape of the stationary object. After this, the localizer 5 localizes the vehicle "v" by matching (superposing) the shape of the stationary object to (upon) the map data. In the present embodiment configured as above, since only the shape of at least one stationary object, except for that of at least one moving object, is matched to the map data, the vehicle "v" can be localized very accurately, even in a traveling environment with moving objects present therein.

After processing has been executed up to step S14, the position that was calculated in step S14 may be compared with that of the destination, whereby it may then be determined whether the vehicle has arrived at the destination, and process control may be returned to the first step (S11). In the present embodiment, however, map updating is continued, which is described below.

After step S14, in step S15 the onboard unit 1a transfers the determination data that was calculated in step S13 and stored into the first storage device 10a, to the second storage device 10b within the management unit 1b via the wireless network. Thus the data indicating whether the object in each voxel during the predetermined time α is an stationary object or a moving one is stored into the management unit 1b.

Next on the basis of the determination data that was input in step S15, the map updating section 7 updates the map data that has been stored in the second storage device 10b before step S15 was executed in step S16. Step S16 may be executed either when the determination data is received from the onboard unit 1a in step S15, or at predetermined intervals of time other than those at which the determination data is received. A detailed flowchart of the process which the map updating section 7 conducts in step S16 is shown in FIG. 8.

Figure 8:
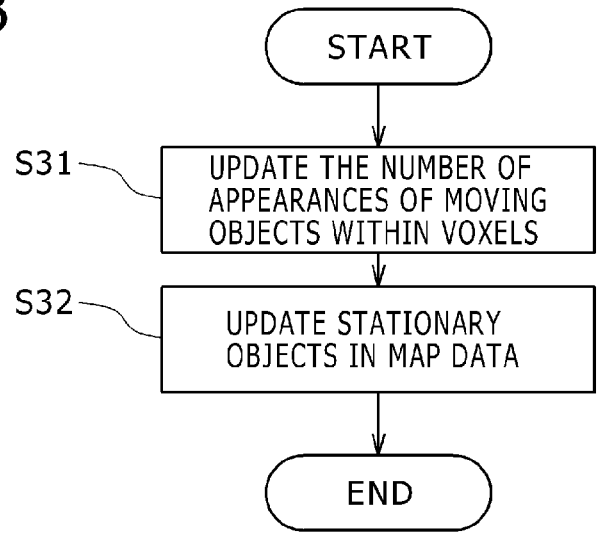
FIG. 8 is a detailed flowchart of a process which a map updating section 7 according to the first embodiment of the present invention conducts.

As shown in FIG. 8, in step S31 the map updating section 7 first refers to the determination data and thus adds the frequency with which moving objects were determined to be present during the predetermined time α, that is, a moving-object score, for each of three-dimensional voxels "g" in the map data. The moving-object scores for the voxels are stored into the second storage device 10b as part of the map data. This enables relatively high moving-object scores to be assigned to the voxels arranged in locations that at least one moving object frequently appears. Conversely, relatively low moving-object scores will be assigned to the voxels arranged in locations that no moving objects appear. Voxels falling outside the measuring range of the shape detector 2 over a predetermined period of time may each be handled as a free space by deleting information about stationary objects, and moving-object scores may be continuously reduced to prevent data in the past from continuing to remain stored.

After step S31, in step S32 the map updating section 7 refers to the determination data, thus updating the regions set in the map data as where at least one stationary object is present. For example, when a new building, which was not present during generation of the map data, has been built, mismatching in contents will occur between the determination data and the map data. In step S32, therefore, in a case where a voxel that the determining section 4 has determined to have a stationary object therein is not set in the map data as where the stationary object is present, the setting of the voxel in the map data is updated to match to the determination data. In other words, the stationary object is added to that voxel in the map data. Conversely, in a case that a voxel that is set in the map data as where a stationary object is present is not determined by the determining section 4 to exist, the setting of the voxel in the map data is updated to match to the determination data. In other words, the stationary object is deleted from that voxel in the map data. Thus the map data can always be maintained in the latest condition, even when the construction of a new building or other changes in environment occur.

Figure 9:
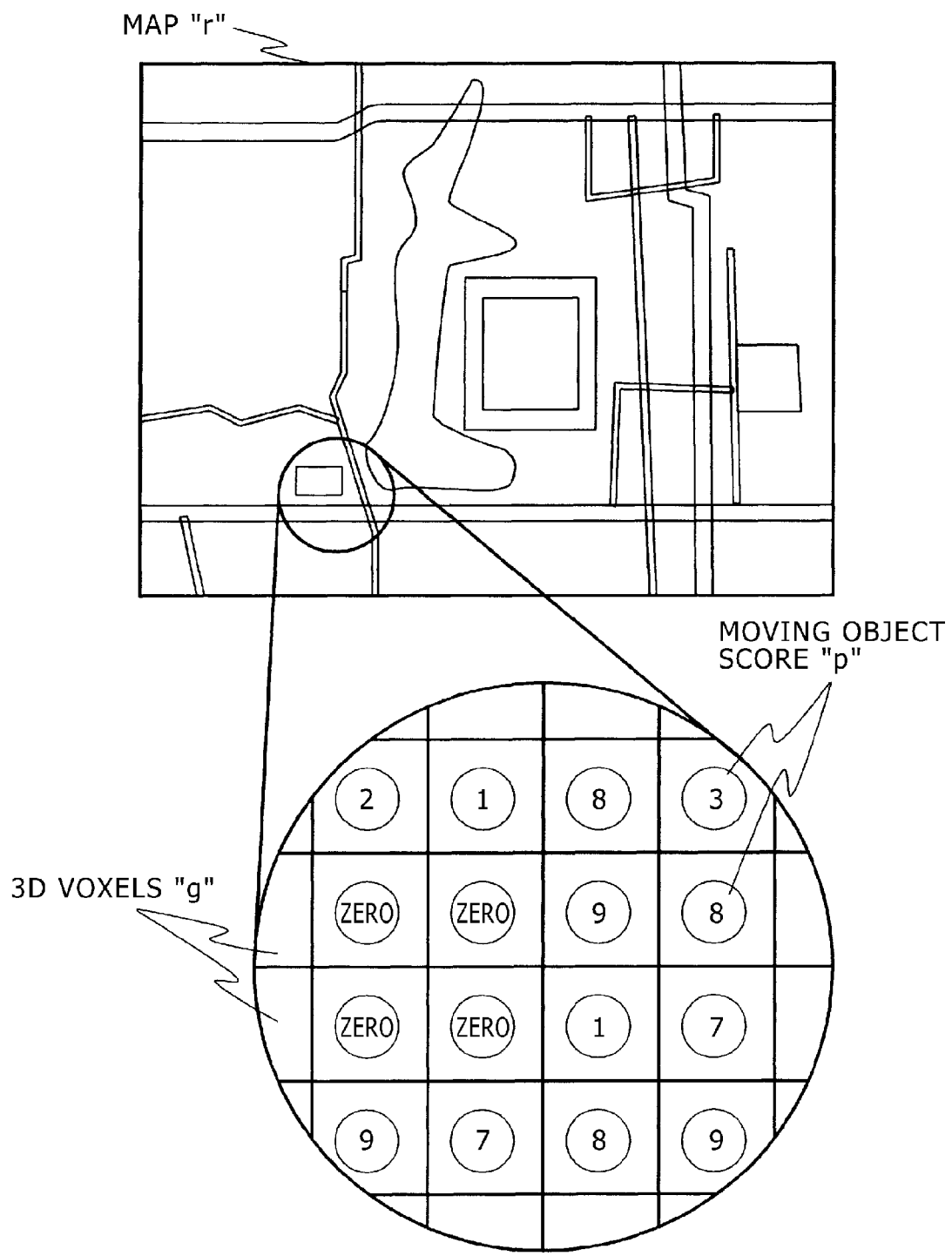
FIG. 9 is a diagram showing a map "r" (map data) as generated according to the first embodiment of the present invention.

FIG. 9 shows a map "r" having moving-object scores added during the process of the map updating section 7, and having voxels of stationary objects updated during the process. Although the map "r" shown in the figure is actually represented in the form of three-dimensional voxels "g", this map is depicted in projected form on a parallel plane as a plan view in FIG. 9. As shown in an upper half of FIG. 9, the shapes of stationary objects are stored in the map "r". In addition, as shown in a lower half of FIG. 9, each of the three-dimensional voxels "g", the data format of the map, has information of a moving-object score "p". For example, a three-dimensional voxel "g" corresponding to a road on which other vehicles, grit and dust, and/or other moving objects frequently appear has a relatively high moving-object score "p", and a three-dimensional voxel "g" corresponding to a stationary object such as a building or tree has a relatively low moving-object score "p".

The localizer 5 can localize the vehicle "v" more accurately by utilizing the moving-object scores "p" when the localizer 5 conducts matching to the map data in Step 14. For example, as described in a reference document (Szymon Rusinkiewicz, Marc Levoy, "Efficient Variants of the ICP Algorithm", Proc. of International Conference on 3-D Digital Imaging and Modeling, 2001), a reciprocal of a moving-object score "p" may be used to denote reliability (weight), and the stationary object whose shape is measured at a location of low reliability (a location at which moving objects appear very frequently) may be set and regarded as a moving object. Use of this matching method, therefore, enables highly accurate localization even under the traveling environment where moving objects exist.

Additionally, in the present embodiment, determination data has been input to the second storage device 10b and map data may be updated to incorporate the determination data. Instead, however, the operation count data that was calculated in step S12 may be input to the second storage device 10b and after such a determination process as conducted in process step S13, map data may be updated to incorporate a result of the determination. If the map data is updated in this manner, the existence of stationary objects even over a long period of time can be incorporated into the map data accurately. The threshold value used here in the determination process may differ from the value of β used in step S13. In other words, a threshold value greater than that used in step S13 is preferably used for enhanced extraction accuracy of stationary objects.

Referring back to the flowchart of FIG. 2, after the map data update process (step S16), in step S17 the display control section 8 of the management unit 1b displays the position of the vehicle "v" that was estimated in step S14, and the map data that was updated in step S16, to an operator via the display device 11 included in the management unit 1b.

In step S18, on the basis of the position of the vehicle "v" that was estimated in step S14, the travel control section 6 controls the autonomous travel of the vehicle "v" so that the vehicle can travel to the destination in accordance with the predefined target path. The autonomous travel here can be made by use of a known method (reference document: Jun Ohta, Daisuke Kurabayashi, and Tamio Arai, "An Introduction to Intelligent Robots", Corona Publishing Co., Ltd. 2001).

In step S19, the travel control section 6 determines whether the destination has been reached. If the destination is not reached, control is returned to the process in step S11. If the destination is reached, the successive process steps are completed, whereby the autonomous mobile system 1 causes the vehicle to determine the measured shape data of the peripheral objects to be that of stationary objects and moving objects, and hence to reach the destination by conducting highly accurate localization even under a traveling environment with moving objects present therein.

In the present embodiment configured as above, therefore, since peripheral objects can be determined to be stationary ones and moving ones, highly accurate matching can be conducted even in a traveling environment with moving objects present therein, and thus, many different kinds of moving objects, including motor vehicles, can be made to reach respective destinations without losing sight of target paths as well as control of localization.

An example in which the second storage device 10b, the map updating section 7, the display control section 8, and the display device 11 are mounted in the management unit (terminal unit 1b) has been described in the above embodiment, but all processing may be done on the vehicle "v" side with these elements mounted on the vehicle (onboard unit 1a). In addition or alternately, the system may be configured so that the shape detector 2, the travel distance detector 3, and the travel control section 6 are mounted on the vehicle "v" and so that other constituent elements are mounted in the management terminal. In this case, the system may be configured so that the data within the detectors 2, 3 will be transmitted from the vehicle "v" to the management unit 1b by means of data communications such as wireless communications, and so that processing that follows will be conducted by the management unit 1b and data on the estimated position of the vehicle will be fed back from the management unit 1b.

Furthermore, while in the above embodiment the data from the shape detector 2 and travel distance detector 3 mounted on one vehicle "v" has been used for the localization of the vehicle, data measured by a plurality of vehicles may be used for purposes such as localizing the vehicle. This case is described below.

FIG. 10 is a schematic block diagram of an autonomous mobile system according to a second embodiment of the present invention. The autonomous mobile system shown in FIG. 10 includes at least onboard units 1aa, 1ab, 1ac mounted on a plurality of vehicles, v1, v2, v3, respectively, and a management unit 1b mounted in a management terminal. The same reference number is assigned to each of the same elements as in the previous figures, and description of these elements may be omitted below.

The onboard units 1aa, 1ab, 1ac shown in FIG. 10 include shape detectors 2a, 2b, 2c, travel distance detectors 3a, 3b, 3c, storage devices 10aa, 10ab, 10ac, and travel control sections 6a, 6b, 6c, respectively. After the detectors 2a, 2b, 2c, 3a, 3b, 3c have detected shape data and travel distance data, the onboard units output the two kinds of data to the storage device 10b of the management unit 1b. The management unit 1b includes an operation count calculating section 9, a determining section 4, and a localizer 5. Process steps S12 to S17 in FIG. 2 are executed in the management unit 1b. Process steps S18, S19 are executed in each of the vehicles v1, v2, v3.

Briefly, in the present embodiment, a plurality of sets of shape data that have each been measured by each of the shape detectors 2 mounted on the plurality of vehicles "v" at the different time of day during a predetermined time are used for the system to determine whether objects are stationary ones or moving ones. In the thus-configured system, reference can be made to a greater amount of shape data than that acquired by one vehicle, so that the system can conduct the stationary/moving object determination more accurately. If the system processes data in substantially the same manner, the system may adopt a configuration other than that shown in FIG. 10.

While the above has described the application of the present invention to the autonomous mobile system for the mobile body which moves while localizing itself, the invention can also be applied to systems requiring the localization of the mobile body, even if the mobile body does not autonomously move.

DESCRIPTION OF REFERENCE NUMBERS

1a Onboard unit
1b Management unit
2 Shape detector (Measuring means)
3 Travel distance detector (Measuring means)
4 Determining section (Determining means)
6 Travel control section
7 Map updating section (Map updating means)
8 Display control section
9 Operation count calculating section
10a First storage device (First storage means)
10b Second storage device (Second storage means)
11 Display device (Display means)

The invention claimed is:

1. An autonomous mobile system for a mobile body which moves while localizing itself in a space, the system comprising:
   a processor;
   a measuring unit that measures whether objects are present or absent in each of regions determined by dividing the space into a plurality of segments according to a predetermined rule;
   a storage device, coupled to the processor, that stores map data indicating a region of the determined regions that has been set as having a stationary object in the region;
   wherein the processor includes
   a determining unit that determines, from frequency of the object detection by the measuring unit during a predetermined time for each of the determined regions, whether the object that has been detected in the region is a stationary object or a moving object; and
   a localizer that localizes the mobile body by matching the region having therein the stationary object which the determining unit has determined to be present, and the region that was set in the map data as having a stationary object in the region.

2. The autonomous mobile system according to claim 1, wherein:
   the storage device stores therein measurement count data and detection count data, the measurement count data denoting, for each of the regions, the number of times the measuring unit has measured the presence/absence of an object at the different time of day during the predetermined time, the detection count data denoting, for each of the regions, the number of times the measuring unit has detected an object at the different time of day during the predetermined time; and
   the determining unit calculates the frequency of the object detection, based upon the measurement count data and the detection count data for each of the determined regions.

3. The autonomous mobile system according to claim 2, wherein:
   the determining unit determines whether the objects detected in the regions are stationary objects or moving objects, depending upon a magnitude of a rate of the detection count for each of the regions to the measurement count.

4. The autonomous mobile system according to claim 3, wherein:
   the determining unit determines that if the magnitude of the rate is equal to or greater than a threshold $\beta$, the object present in the region is a stationary object, and that if the magnitude of the rate is less than a threshold $\beta$, the object present in the region is a moving object.

5. The autonomous mobile system according to claim 1, further comprising:
   a map updating unit that updates, in accordance with a result of the determination by the determining unit, the region set in the map data as having a stationary object in the region.

6. The autonomous mobile system according to claim 1, wherein:
   the measuring unit, the determining unit, and the localizer are mounted on the mobile body;
   the storage device is mounted in the mobile body; and
   the mobile body exchanges data with a management terminal through wireless communication.

7. The autonomous mobile system according to claim 1, wherein:
   the measuring unit is mounted on a plurality of mobile bodies including the mobile body; and
   the storage device stores therein measurement count data and detection count data, the measurement count data denoting, for each of the regions, the number of times the measuring unit has measured the presence/absence of an object at the different time of day during the predetermined time, the detection count data denoting, for each of the regions, the number of times the measuring unit has detected an object at the different time of day during the predetermined time.

8. The autonomous mobile system according to claim 1, further comprising:
   a display device that displays a position of the mobile body which has been localized by the localizer, and the map data.

9. The autonomous mobile system according claim 1, wherein:
   each of the regions is a region determined by dividing the space into a plurality of parallelepipeds.

10. The autonomous mobile system according to claim 1, wherein:
   the measuring unit detects shape data of objects present around the mobile body, and detects a travel distance of the mobile body; and
   the measuring unit measures presence/absence of objects in each of the regions in accordance with the shape data and the travel distance.

* * * * *